United States Patent [19]

Humes, Jr. et al.

[11] 4,227,103

[45] Oct. 7, 1980

[54] APPARATUS FOR INSULATING AN INTERNAL MOTOR CONNECTION

[75] Inventors: Calvin Humes, Jr., Sycamore, Ill.; Sammy L. Miller, Jurong Town, Singapore; Alan L. Kindig, Holland, Mich.

[73] Assignee: General Electric Company, Fort Wayne, Ind.

[21] Appl. No.: 879,395

[22] Filed: Feb. 21, 1978

[51] Int. Cl.³ .......... H02K 11/00

[52] U.S. Cl. .......... 310/71; 174/74 A; 174/138F; 336/192

[58] Field of Search .......... 310/71, 45, 214, 194, 310/260, 42; 29/628; 339/59, 61, 217 R, 36, 116 R, 116 C; 174/74 A, 138 F; 336/107, 192

[56] References Cited

U.S. PATENT DOCUMENTS

| | | | |
|---|---|---|---|
| 2,792,444 | 5/1957 | Bergan | 174/138 F |
| 3,457,442 | 7/1969 | Charlton | 310/71 |
| 3,502,917 | 3/1970 | Bizoe | 310/71 |
| 3,518,616 | 6/1970 | Lewis | 310/71 |
| 3,825,880 | 7/1974 | Battaglia | 339/217 R |
| 3,912,957 | 10/1975 | Reynolds | 310/71 |
| 4,004,169 | 1/1977 | Charlton | 310/71 |

*Primary Examiner*—R. Skudy
*Attorney, Agent, or Firm*—Ralph E. Krisher, Jr.

[57] ABSTRACT

An insulated internal connection arrangement between a terminal end of a winding of a dynamoelectric machine and at least one other wire conductor is disclosed. The connection arrangement includes an insulator having at least one elongated generally tubular receptacle with one end thereof open and the other end closed and having an internal restriction between the open and closed ends. A connector disposed within the at least one receptacle, electrically joins winding and wire conductor ends. The connector has a flared portion which cooperates with the internal restriction to firmly capture the connector within the receptacle. The insulator may include a plurality of receptacles formed from a single sheet of insulating material with the receptacles disposed generally coplanar and with each receptacle opening in the same direction. The internal restriction may comprise a depression extending transverse to each of the receptacles. The insulator may be formed by rolling a sheet of insulating material in a sinuous pattern to form a plurality of receptacles and providing a seam generally along a path in the direction of elongation of those receptacles to maintain the sheet in its sinuous configuration. A transverse seam is formed near one end of the rolled sheet to close the receptacles at that one end, and a side wall of one or more of the receptacles is deformed, for example, by heating in a region between the closed and open ends of the receptacles to form the connector holding internal irregularity or restriction. When the connected conductors are inserted into the receptacle open end, the connector passes beyond the internal irregularity or restriction, and the restriction cooperates with a flared trailing edge of the connector to hold the connector and its associated conductors within the receptacle.

1 Claim, 12 Drawing Figures

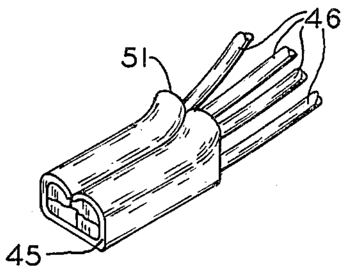
FIG. 1
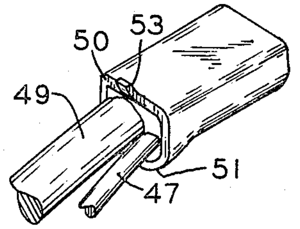
FIG. 2
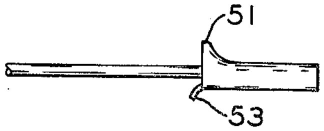
FIG. 3
FIG. 4
FIG. 5
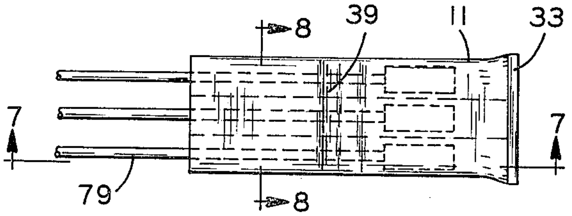
FIG. 6
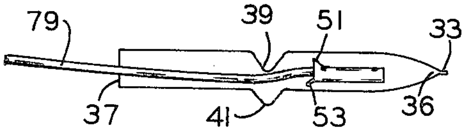
FIG. 7
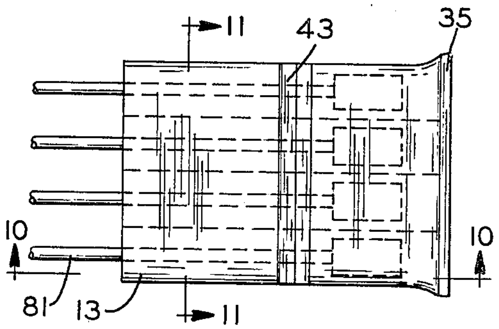
FIG. 9
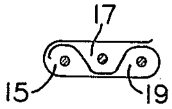
FIG. 8
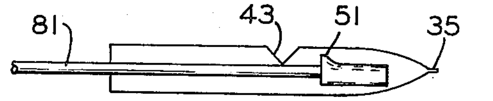
FIG. 10
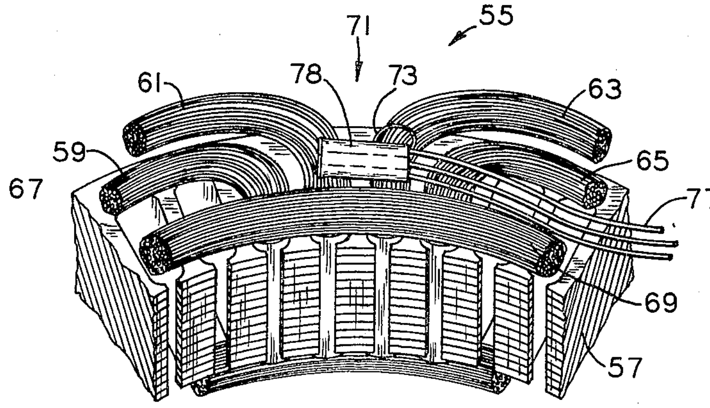
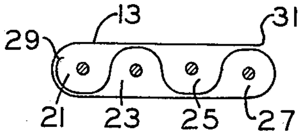
FIG. 11
FIG. 12

APPARATUS FOR INSULATING AN INTERNAL MOTOR CONNECTION

BACKGROUND OF THE INVENTION

The present invention relates generally to the manufacture of electrical machinery and more particularly to establishing and insulating internal electrical connections in dynamoelectric machines.

Considerable art has been developed regarding the establishing of electrically insulated connections in dynamo-electric machines which includes the interconnecting of windings of such machines with other windings or with external lead wires and then insulating such connections. For example, the Reynolds U.S. Pat. No. 3,912,957 which is commonly assigned to the assignee of the present invention, discloses, among other things, a multiple barrel tubular insulator which may, for example, be formed from a single sheet of insulating material. In one disclosed form, a multibarrel insulator is slipped over particular wires to be connected to other lead wires; whereupon, insulation-free portions of those wires are connected to the other lead wires. After connections are established, the multiple barrel insulator is slid over the connections to insulate those connections, one from the other, as well as to insulate those connections from other external machine parts.

It is also known to connect insulation-free ends of two or more wires by crimping a connector about those ends so that the several interconnected wires extend from the crimped connector in generally the same direction. For this type of electric interconnection, the McNeal U.S. Pat. No. 3,748,510 which is commonly assigned to the assignee of the present invention, discloses, among other things, tubular insulating receptacles into which such a connection may be pushed for insulating that connection from other machine parts. McNeal discloses, for example, that sheet material may be formed into a tube and then crimped or heated near the central region of the tube to form two isolated receptacles extending in opposite directions from the crimped region. While this latter arrangement avoids the need for threading the wires through the insulator prior to effecting the electrical interconnection, the connected wires in this latter arrangement may, in some cases, become dislodged from their insulating receptacles.

It is known that connections can be insulated by wrapping or deforming pressure sensitive tape thereabround; however this technique is often time consuming, especially when multiple connections must be insulated and does not allow for intentional removal of the connections if necessary and for subsequent reuse of the insulating material. Thus, it would be desirable to develop a new and improved connection insulator with connection retaining provisions to prevent inadvertent removal of the connection while allowing easy intentional removal of the connections for repair, testing or inspection, and an insulator which would be reusable after connections have been removed therefrom.

Accordingly, a general object of the present invention is to provide new and improved connection insulators and new and improved methods of making and insulating electrical connections.

A more specific object of the present invention is to provide new and improved connection insulators having improved connection retention characteristics.

Another object of the present invention is to provide new and improved connection insulators which allow intentional removal and subsequent reinsertion of connections while impeding inadvertent removal of the connections.

Still another object of the present invention is to provide new and improved methods of making internal connections in a dynamoelectric machine which minimize fabrication time and improve reliability.

SUMMARY OF THE INVENTION

One preferred form of practicing the invention includes rolling a sheet of insulating material in a sinuous pattern to form generally elongated parallel tubular receptacles, establishing a first seam generally along a path in the direction of tubular elongation to maintain the sheet in the sinuous configuration, and establishing a second seam near one end of the rolled sheet to close respective ends of the receptacles. This one preferred form further involves deforming a side wall of one or more of the receptacles in a region between the closed and open ends to form a connector retaining irregularity within the receptacle. Two or more conductors are joined at their ends and the resulting electrical connection is inserted into the receptacle to pass beyond the deformed side wall region so that the deformed region tends to hold the conductor ends within the receptacle.

One way of establishing the electrical connection involves crimping a strip of conductive material about the conductors and in another way the crimping further involves establishing a flared end for engaging side walls of a receptacle when the connected conductor ends are inserted into the receptacle.

Another preferred form of the invention may be practiced in fabricating a dynamoelectric machine stator assembly including a magnetic core, at least one winding arranged on the core, and a number of wire coils having end turns projecting beyond a face of the core. At least one terminal end of the winding and another wire conductor are electrically joined and accommodated within an electrical insulator. The insulator includes an elongate member having a continuous peripheral wall defining at least one receptacle having an open end and a closed end. The receptacle includes an internal irregularity or depression between the open and closed ends, past which the connection is forced when the connection and insulator are assembled with that irregularity impeding the inadvertent removal of the connection from the receptacle, but permitting intentional removal of the connection from the receptacle.

In one aspect of the invention, insulators are formed from a single sheet of insulating material arranged to define a plurality of substantially similar receptacles, each opening in the same direction. An irregularity for impeding inadvertent connection removal comprises a heat deformed depression in the peripheral wall of the insulator. The connection may include a conductive strip crimped about a winding terminal end and a wire conductor. The assembled connected and insulator may be positioned between adjacent windings of the stator assembly to lessen the chance that the insulator will slip from the connector during further processing of the stator assembly.

BRIEF DESCRIPTION OF THE DRAWING

FIG. 1 is a perspective view of a crimp type connector, electrically connecting the ends of four conductors;

FIG. 2 is a perspective view of the bottom side of the connector of FIG. 1, electrically connecting a winding lead to an external lead;

FIGS. 3, 4, and 5 are side, bottom and end views, respectively, of a connector of the type illustrated in FIGS. 1 and 2;

FIGS. 6, 7, and 8 are top, side section and end section views, respectively, of an insulator containing a trio of connectors and associated wire conductors;

FIGS. 9, 10, and 11 are top, side section and end section views, respectively, of an insulator connector arrangement similar to that illustrated in FIGS. 6, 7, and 8, containing, however, four connectors and associated leads and illustrating a modified form for locking the connectors within the insulators; and FIG. 12 is a perspective view of a stator assembly segment with insulated connectors in a preferred location.

Corresponding reference characters indicate corresponding parts throughout the several views of the drawing.

The exemplifications set out herein illustrate a preferred embodiment of the invention in one form thereof, and such exemplifications are not to be construed as limiting the scope of the disclosure or the scope of the invention in any manner.

DESCRIPTION OF THE PREFERRED EMBODIMENTS

Referring now to the drawings in general, one preferred form of the invention may be practiced when establishing insulated electrical connections between conductors. In practicing one preferred form of the invention, a sheet of insulating material 11 or 13 formed from electrical insulating material such as, for example, the material marketed under the trademark "MYLAR" by the E. I. DuPont de Nemours and Company is, as illustrated in FIGS. 8 and 11, rolled in a sinuous pattern to form a plurality of generally parallel elongated tubular receptacles 15, 17 and 19, or 21, 23, 25 and 27. The several tubular receptacles may be formed from a single sheet of flexible insulating material, for example as depicted in FIG. 11. Beginning at an edge 29, the sheet 13 progresses counterclockwise as viewed in FIG. 11 to form the left-hand portion of receptacle 21 and thereafter forms each of the corrugated or serpentine inner walls for the insulator. The sheet continues clockwise as the right edge of receptacle 27 is formed and the entire insulator is circumscribed causing the sheet to pass over the beginning edge 29, and to terminate along an edge 31. A seam is then formed between the edge 31 and the top portion of the sheet-forming receptacle 27. Edge 31 extends in the direction of elongation of the tubular receptacles and the seam may be formed by one or more spot-welds or a continuous weld along the edge 31. The welding of the insulator material may be achieved by heating or by ultrasonic techniques, as well as by the use of more conventional adhesives or solvents, as may be appropriate for the particular insulator material or environment in which the insulator is being utilized. The seam, regardless of its particular configuration or method of forming, functions to secure the sheet 13 to itself and thus, maintain the sheet in the depicted sinuous configuration. A further optional seam may be formed along the edge 29 to the outer insulating portion of the sheet if desired. Insulating sheet 11 may be rolled and seamed in an analagous manner to establish the connection insulator as illustrated in FIGS. 6–8.

A second seam 33 or 35 is formed near one end of the respective rolled sheets 11 or 13 to closethe plurality of receptacles at the right end, as illustrated in FIGS. 6 and 9. Each insulator now has a plurality of receptacles, each having one open end and one closed end.

As illustrated in FIGS. 7 and 10, the electrical insulators are provided with a means for aiding retention of electrical connections therein. In FIG. 7, a side wall of at least one and typically all of the receptacles has been deformed in a region between the closed ends 36 and the opposed open ends 37. This deformation which may appear as heat induced compressive wrinkles 39 and 41 in FIG. 7, or as a heat formed depression or notch 43 as in FIG. 10. In the preferred form, the deformation appears as a depression extending transverse to each of the receptacles and provides an irregularity inside the respective receptacles for impeding the inadvertent removal of a connector from a receptacle, but which permits intentional removal of a connector from the receptacle.

FIGS. 1 through 5 illustrate a system for connecting two or more conductors by crimping a conductive strip about insulation-free ends of the conductors. In FIG. 1, four conductors 46 are illustrated as being crimp-joined by a conductive strip 45. In FIG. 2, two conductors 47 and 49 are electrically joined by a similar crimped conductive strip 50. In an exemplary environment of a dynamoelectric machine stator assembly, the four conductors 46 joined in FIG. 1 might, for example, be the several interpole leads of the machine windings. The two dissimilar size conductors 47 and 49 illustrated in FIG. 2 might, for example, illustrate the interconnection of the winding lead 47 and the external machine conductor 49.

Although crimping to form such dynamoelectric machine interconnections has been done in the past, it will be noted as best illustrated in FIGS. 1 and 3 that the conductive strip 45 includes a flared end region or skirt 51 occurring along the end of the crimped connector from which the several leads emanate. Also, as best seen in FIGS. 3 and 4, a so-called scrap tap or tab 53 is shown for further aiding retention of the connection within an insulator receptacle of the type illustrated herein. The tab may, for example, be the residual portion of conductive material which mechanically connected individual conductive strips to a long series of interconnected conductive strips. The conductive strips could be machine fed to a crimping device to establish crimped electrical connections of the type illustrated. In other words, individual conductive strips, such as 45, may be sheared from a strip of stock material along the edge of the tab 53. Tab 53 is flared downwardly, as viewed in FIG. 3, to provide further enlarged skirting or flaring of the one end of the crimped conductor strip. The regions of flares 51 and 53 are designed to cooperate with the deformed side wall region, such as 39 or 43, in FIGS. 6, 7 and 9, 10, to hold the conductor ends and crimped connector within the insulating receptacles.

FIG. 12 illustrates a portion of a stator assembly 55 for use in a dynamoelectric machine such as an electric motor. As illustrated, the stator assembly includes a magnetic core 57, coils 59 and 61 of one main winding pole group and coils 63 and 65 of another main winding pole group. The end turn portions of the coils extend from face 67 of the stator core 57. The stator assembly may, of course, also include auxiliary or start windings such as 69. A connection arrangement indicated generally at 71, is provided for connecting and insulating interconnections among ends of the windings and lead wires extending externally of the stator assembly. The connection arrangement includes connection means for joining, for example, one terminal end 73 of a main winding to an end of a motor lead, such as 77. The connection arrangement further includes an electrical insulator 78 for accommodating the connection means in a manner, for example, as illustrated in FIG. 6. The insulator 78 is positioned at the break of the main winding comprising the coils 59, 61, 63, and 65, and is disposed between the coils of the main winding and end turns of start winding 69. Positioning of the insulator at the illustrated location helps prevent damage and displacement of the insulator and electrical connections therein in the event the stator assembly is subjected to a pressing operation for shaping and compressing the end turns of the windings.

From FIGS. 8 and 11, it is apparent that the several receptacles comprise a series of coplanar tubular portions all of which open in the same direction. From FIGS. 6 and 9, it is also apparent that the several crimp-joined conductors may be simultaneously or sequentially inserted into open ends of the receptacles with each crimped connector being forced past a corresponding deformation such as 39 or 43. Referring to FIGS. 7 and 10, it is further apparent that the irregularities or depressions 39 and 43 cooperate with the flared end 51 on the crimped strips to impede the inadvertent removal of the connections from the receptacles, and yet permit intentional removal of the connections for purposes of repair, testing, or inspection purposes and subsequent reinsertion of such connections in the same receptacles. Thus, for example, flared skirt portion 51, as illustrated in FIG. 7, would engage depression 39, impeding the removal of the connector from the receptacle, for example due to pulling on the conductor 79. Similarly, any pulling of conductor 81 relative to the receptacle 83 illustrated in FIG. 10 will result in flare 51 engaging notch 43 to impede withdrawal of the connector from the receptacle, thereby lowering the chance for displaced or lost insulators within the machine.

From the foregoing it is now apparent that a novel method of insulating electrical connections, as well as a novel insulated internal connection, as well as such a connection in conjunction with a stator assembly, has been disclosed meeting the objects and advantageous features set out hereinbefore, as well as others, and that modifications as to the precise configurations, shapes and details, as well as the precise steps of the method, may be made by those having ordinary skill in the art, without departing from the spirit of the invention or the scope thereof as set out by the claims which follow.

What we claim as new and desire to secure by Letters Patent of the United States is:

1. In a stator assembly for use in a dyanmo-electric machine comprising a magnetic core, windings, and a plurality of lead wires interconnected by crimp connections, wherein a plurality of crimp connections are disposed in multi-connection protecting insulator made from insulating material arranged to define a plurality of longitudinally extending insulating compartments, wherein the multi-connection protecting insulator is formed of a sheet of insulating material having first and second compartments laterally separated from one another, and wherein the plurality of insulated compartments are defined by a single sheet of insulating material, the improvement wherein: exterior walls of the compartments of the insulator have transversely extending depressions therein so that correspondingly located irregularities are provided along the interiors of the plurality of compartments, whereby intentional removal of connection means from each compartment is permitted, while inadvertent removal of connections from each compartment is impeded.

* * * * *